(12) United States Patent
Zhang et al.

(10) Patent No.: US 11,495,979 B2
(45) Date of Patent: Nov. 8, 2022

(54) CHARGING OUTPUT PROTECTION CIRCUIT AND RELATED METHOD

(71) Applicant: Globe (Jiangsu) Co., Ltd., Jiangsu (CN)

(72) Inventors: Yong Zhang, Jiangsu (CN); Yanqiang Zhu, Jiangsu (CN)

(73) Assignee: Globe (Jiangsu) Co., Ltd., Jiangsu (CN)

( * ) Notice: Subject to any disclaimer, the term of this patent is extended or adjusted under 35 U.S.C. 154(b) by 41 days.

(21) Appl. No.: 16/713,646

(22) Filed: Dec. 13, 2019

(65) Prior Publication Data

US 2020/0195024 A1 Jun. 18, 2020

(30) Foreign Application Priority Data

Dec. 14, 2018 (CN) .......................... 201811533548.7

(51) Int. Cl.
*H02J 7/00* (2006.01)

(52) U.S. Cl.
CPC ........ *H02J 7/0031* (2013.01); *H02J 7/00036* (2020.01); *H02J 7/0036* (2013.01); *H02J 7/0047* (2013.01)

(58) Field of Classification Search
CPC .................................................. H02J 7/0031
USPC ......................................................... 320/134
See application file for complete search history.

(56) References Cited

U.S. PATENT DOCUMENTS

| 9,637,003 B2* | 5/2017 | Leonard | H02J 7/0047 |
| 10,498,135 B2 | 12/2019 | Zhang | |
| 2004/0101744 A1* | 5/2004 | Suzuki | H01M 50/20 429/61 |
| 2004/0189259 A1* | 9/2004 | Miura | H02J 7/0029 320/134 |
| 2007/0103834 A1* | 5/2007 | Huang | H02J 7/0031 361/104 |
| 2014/0028267 A1* | 1/2014 | Lee | H02J 7/00 320/152 |
| 2015/0048797 A1* | 2/2015 | Song | H02J 7/0031 320/134 |
| 2015/0180248 A1* | 6/2015 | Yang | H02J 7/00308 320/162 |
| 2018/0183247 A1* | 6/2018 | Yamauchi | H02J 7/0031 |

\* cited by examiner

*Primary Examiner* — Yalkew Fantu
(74) *Attorney, Agent, or Firm* — Rooney IP, LLC

(57) ABSTRACT

A charging output protection circuit and a charging output protection method. The charging output protection circuit includes a battery pack, a charger, a hardware control unit, and a software control unit, the hardware control unit including a detecting circuit for detecting whether a voltage of the battery pack is normal, a first triode connected to the detecting circuit, and a first a relay, the first triode is configured to control the first relay to be switched off or on based on the detection result of the detecting circuit; the software control unit includes a single chip microcomputer, a communication circuit for communicating between the single chip microcomputer and the battery pack, a second triode and a second relay connected to the single chip microcomputer, and the second triode is used for controlling the second relay to be switched off or on based on the instruction of the single chip microcomputer.

8 Claims, 4 Drawing Sheets

CHARGING OUTPUT PROTECTION CIRCUIT AND RELATED METHOD

TECHNICAL FIELD

The present invention relates to a charging output protection circuit and a charging output protection method.

BACKGROUND ART

At present, the control output mode of the charger usually uses software/hardware to control the shutdown/cut-off of a single MOS transistor or a single relay. However, such two type of single control methods are not suitable for applications where the output high voltage (for example, greater than 40V) is applied. This is because when a single MOS transistor or a single relay control fails, there are safety issues with the high voltage of the charger output. Moreover, the existing software control method has a slower response speed than the hardware control method, and there is a problem of protection hysteresis.

In order to solve the problem of single MOS transistor or single relay control failure, it is necessary to add a mechanical trigger switch at the input end of the charger, but the increase of the mechanical trigger switch makes the shape structure of the charger complicated, and the mechanical trigger switch is prone to be in poor contact in the process of installation, resulting in increased charger defect rate and it does not meet the requirements of safety certification.

In view of this, it is indeed necessary to improve the control output mode of the existing charger to solve the above problems.

SUMMARY OF INVENTION

An object of the present invention is to provide a charging output protection circuit and a charging output protection method. The charging output protection circuit and the charging output protection method according to embodiments of the invention can be applied to a high voltage output occasion with a fast response speed and high reliability.

To achieve the above object, the present invention provides a charging output protection circuit comprising a battery pack, a charger, a hardware control unit, and a software control unit, wherein said hardware control unit comprising a detecting circuit for detecting whether a voltage of the battery pack is normal, a first triode connected to the detecting circuit, and a first relay, said first triode is configured to control said first relay to be switched off or on based on the detection result of the detecting circuit; said software control unit comprises a single chip microcomputer, a communication circuit for communicating between the single chip microcomputer and the battery pack, a second triode and a second relay connected to the single chip microcomputer, and said second triode is used for controlling the second relay to be switched off or on based on the instruction of the single chip microcomputer.

In some embodiments, said battery pack has a charging port and a communication port, and said detecting circuit is configured to detect a voltage value of the charging port of the battery pack and compare it with a reference voltage value; one end of said communication circuit is connected to a single chip microcomputer, and the other end is connected with the communication port of the battery pack to realize the interactive communication between the single chip microcomputer and the battery pack.

In some embodiments, said detecting circuit comprises a voltage comparator for comparing the detected voltage value of the battery pack charging port with a reference voltage value and outputting a high/low level based on the comparison result, said hardware control unit controls said first triode to be turned on or off based on the high/low level to make said first relay to be switched on or off.

In some embodiments, said detecting circuit further comprises a voltage division circuit, wherein a voltage value of said charging port of said battery pack is transmitted to said voltage comparator through said voltage division circuit.

In some embodiments, said communication circuit is configured to transmit voltage, current, temperature and time information between said single chip microcomputer and the communication port of said battery pack, and said software control unit is configured to control said second triode to be turned on when the communication circuit operates normally, so that said second relay is switched on.

In some embodiments, said battery pack has an electrode port, and said single chip microcomputer is connected to said electrode port to monitor the voltage of the battery pack.

In order to achieve the above object, the present invention further provides a charging output protection method, which is applicable to a charging output protection circuit, said charging output protection circuit comprises a battery pack, a charger, a hardware control unit, and a software control unit, said hardware control unit comprising a detecting circuit, a first triode connected to the detecting circuit, and a first relay; said software control unit comprises a single chip microcomputer, a communication circuit, a second triode and a second relay connected to the single chip microcomputer, and said charging output protection method comprises the following steps:

connecting the charger to the battery pack and powering on;

detecting, by the communication circuit, whether the charger and the battery pack complete the communication handclasp;

detecting, by the detecting circuit, whether the voltage of the battery pack is normal, and detecting, by the communication circuit, whether the interactive communication between the single chip microcomputer and the battery pack is normal, when the charger and the battery pack complete the communication handclasp;

controlling, by the hardware control unit, the first triode to be turned on, and the first relay to be switched on, when the voltage of the battery pack is normal, such that the charging voltage of the charger is transmitted to the input of the second relay via the first relay;

controlling, by the software control unit, the second triode to be turned on, and the second relay to be switched on, when the interactive communication between the single chip microcomputer and the battery pack is normal, such that the charging voltage of the charger is transmitted to the battery pack via the second relay.

In some embodiments, said battery pack has a charging port and a communication port, and said detecting circuit is configured to detect a voltage value of the charging port of the battery pack and compare it with a reference voltage value; one end of said communication circuit is connected to the single chip microcomputer, and the other end is connected with the communication port of the battery pack to realize the interactive communication between the single chip microcomputer and the battery pack.

In some embodiments, said detecting circuit comprises a voltage comparator for comparing the detected voltage value of the battery pack charging port with a reference voltage value and outputting a high/low level based on the comparison result, said hardware control unit controls said first triode to be turned on or off and controls said first relay to be switched on or off based on the high/low level.

In some embodiments, said communication circuit is configured to exchange voltage, current, temperature and time information between the single chip microcomputer and the battery pack.

The beneficial effects of the present invention are: the charging output protection circuit according to embodiments of the invention is composed of a first relay controlled by a hardware control unit and a second relay controlled by a software control unit, and the charging output is controlled by the two-stage relay control, so that when one relay control fails, the other relay control can also turn off the charging output and plays a protective role, which solves the problem that the software/hardware control single relay or the single MOS transistor control circuit cannot be safely applied to the high voltage output occasion in the prior art.

DESCRIPTION OF EMBODIMENTS

In order to make the objects, technical solutions and advantages of the present invention more clearly, the present invention will be described in detail below with reference to the drawings and specific embodiments.

The invention discloses a charging output protection circuit and a charging output protection method, for applying to high voltage (e.g., greater than 40V) output occasions.

Figure 1:
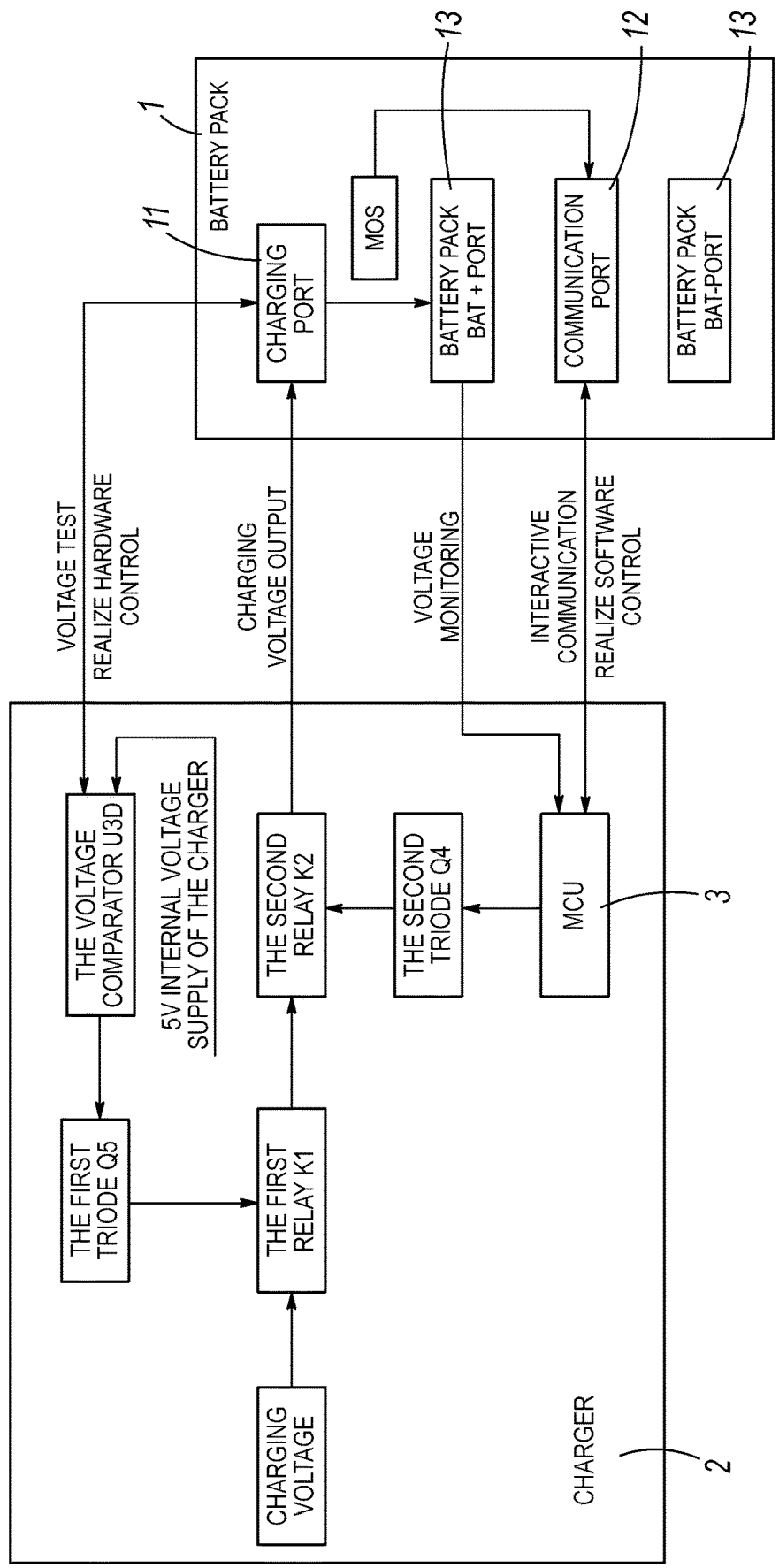
FIG. 1 is a structure diagram of the charging output protection circuit according to embodiments of the invention.

Referring to FIG. 1, the charging output protection circuit comprises a battery pack 1, a charger 2, a hardware control unit, and a software control unit. The battery pack 1 is connected to the charger 2 for charging the battery pack 1 with the charging voltage output from the charger 2.

The hardware control unit comprises a detecting circuit for detecting whether the voltage of the battery pack 1 is normal, a first triode Q5 connected to the detecting circuit, and a first relay K1, the first triode Q5 is configured to control the first relay K1 to be switched off or on according to the detection result of the detecting circuit.

Specifically, the battery pack 1 has a charging port 11 and a communication port 12, and the detecting circuit detects the voltage value of the charging port 11 of the battery pack 1 and compares it with the reference voltage value. The detecting circuit comprises a voltage comparator U3D for comparing the detected voltage value of the charging port 11 of the battery pack 1 with a reference voltage value and outputting a high/low level according to the comparison result, the hardware control unit controls the first triode Q5 to be conducted or cutoff according to the high/low level to make the first relay K1 to be turned on or off.

The detecting circuit further comprises a voltage division circuit, wherein a voltage value of the charging port 11 of said battery pack 1 is transmitted to said voltage comparator U3D through said voltage division circuit. Specifically, first, the detecting circuit detects the voltage value of the charging port 11 of the battery pack 1 to obtain a voltage value; then, the detecting circuit transmits the detected voltage value to the 12-pin of the voltage comparator U3D via the voltage division circuit. Then, the voltage comparator U3D compares the voltage value of the 12-pin with the reference voltage value of the 13-pin, and according to the comparison result, the 14-pin of the voltage comparator U3D outputs high/low level; finally, the hardware control unit controls the first triode Q5 to be turned on or off, and then controls the first relay K1 to be switched on or off according to the high/low level output by the 14-pin of the voltage comparator U3D. Preferably, the reference voltage value is a 5V voltage source outputted by the charger 2; taking the 60V battery pack as an example, the normal voltage of the charging port 11 of the battery pack 1 is 25-60V.

The software control unit comprises a single chip microcomputer (MCU) 3, a communication circuit for communicating between the single chip microcomputer 3 and the battery pack 1, a second triode Q4 and a second relay K2 connected to the single chip microcomputer 3, and said second triode Q4 is used to control the second relay K2 to be switched on or off according to the instruction of the single chip microcomputer 3.

Specifically, the single chip microcomputer 3 is disposed in the charger 2 to implement software control between the battery pack 1 and the charger 2; one end of the communication circuit is connected to the single chip microcomputer 3, and the other end is connected to the communication port 12 of the battery pack 1, to realize the interactive communication between the single chip microcomputer 3 and the battery pack 1. The communication circuit is configured to transmit the battery number, voltage, current, temperature and time information between the single chip microcomputer 3 and the communication port 12 of the battery pack 1 to realize information exchange between the single chip microcomputer 3 and the battery pack 1; the software control unit is configured to control the second triode Q4 to be turned on when the communication circuit operates normally, so that the second relay K2 is switched on.

The battery pack 1 further comprises an electrode port 13 to which the single chip microcomputer 3 is connected, to monitor the voltage of the battery pack 1.

Figure 2:
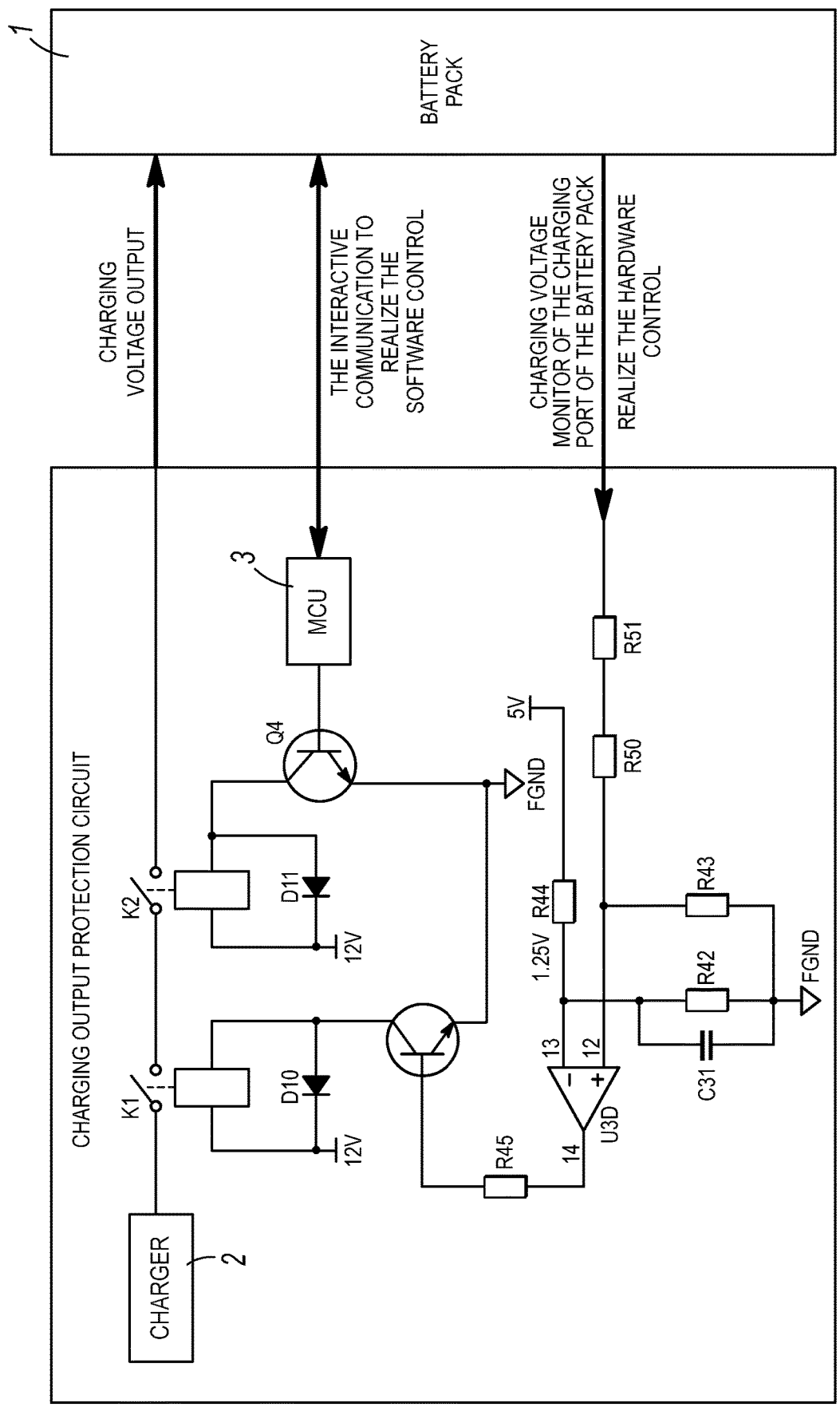
FIG. 2 is a schematic diagram showing the operation of the charging output protection circuit shown in FIG. 1.
Figure 3:
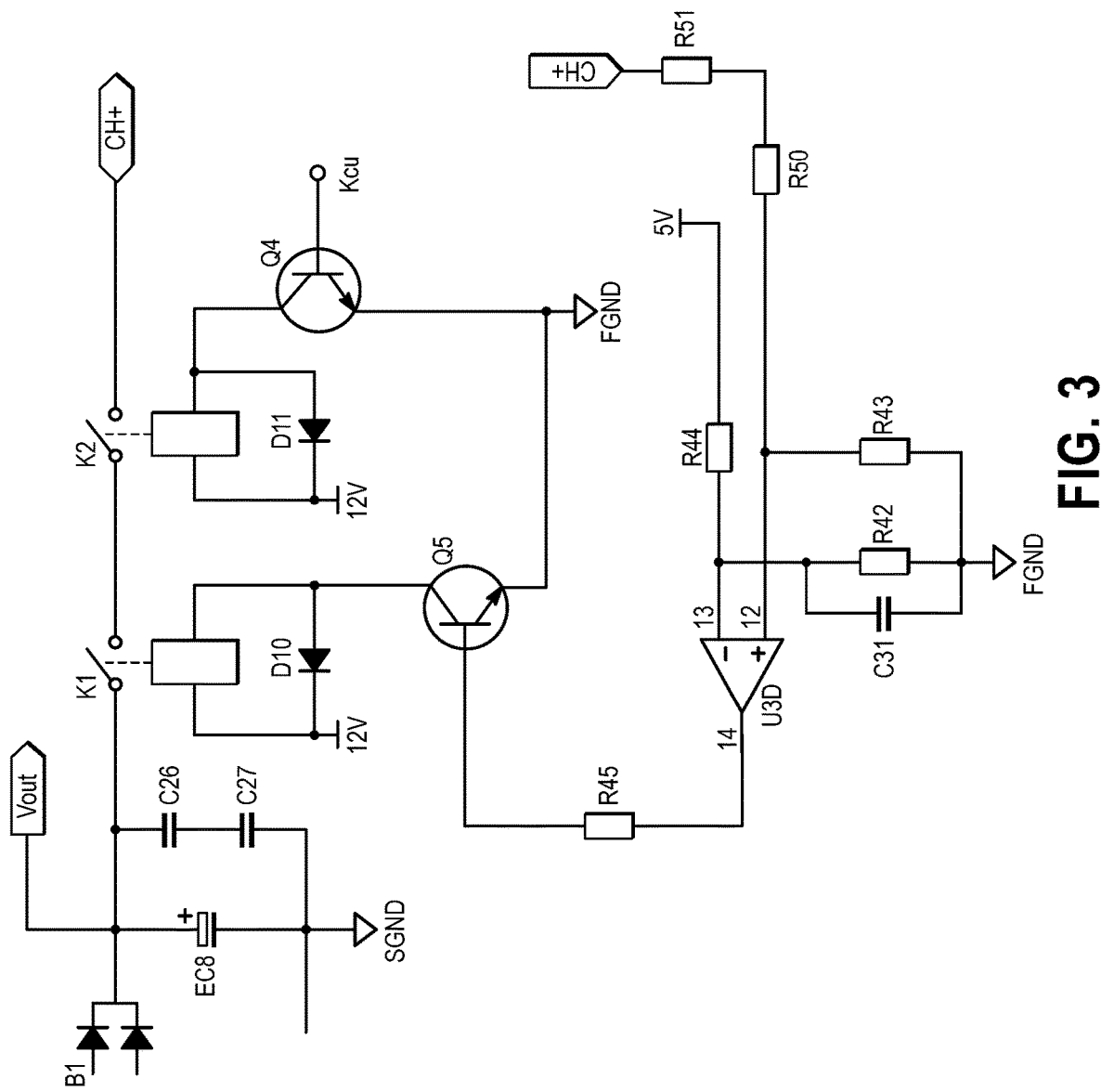
FIG. 3 is an electric schematic diagram of the charging output protection circuit shown in FIG. 1.

Referring to FIG. 2 and FIG. 3, in a preferred embodiment, the voltage division circuit of the detecting circuit comprises resistors R51, R50 and R43. The resistor R51 is respectively connected to the resistor R50 and the charging port 11, and the resistor R43 and the resistor R50 are connected to the 12-pin of the voltage comparator U3D, the other end of the resistor R43 is grounded. Preferably, the resistance values of the resistors R51, R50 and R43 range from 1K ohms to 100K ohms. The detecting circuit further comprises: one ends of the resistors R44 and R42 are respectively connected to the 13-pin of the voltage comparator U3D, the other end of the resistor R42 is grounded and the capacitor C31 is connected in parallel, and the other end of the resistor R44 is connected to the 5V voltage source. Preferably, the resistance values of the resistors R42 and R44 range from 500 ohms to 10K ohms, and the values of the capacitor C31 ranges from 100 nF to 1 µF. The 14-pin of the voltage comparator U3D is connected to the first triode Q5 through the resistor R45, and the resistance values of the resistor R45 ranges from 100 ohms to 10 k ohms.

Specifically, the working principle of the charging output protection circuit is: after the battery pack 1 is inserted into the charger 2 and powered on, the battery pack 1 and the single chip microcomputer 3 of the charger 2 first establish a communication handclasp, and then the hardware control unit detects the voltage value of the charging port 11 of the battery pack 1 through the detecting circuit, and then transmitted the voltage value to the 12-pin of the voltage comparator U3D via the voltage division circuit, and the voltage value of the 12-pin is compared with the reference voltage value of the 13-pin by the voltage comparator U3D, according to comparing results, the 14-pin output of the voltage comparator U3D is high/low level; the hardware control unit controls the first triode Q5 to be turned on or off according to the high/low level of the 14-pin output of the voltage comparator U3D, and then the first relay K1 is turned on or off; then, the software control unit controls the second triode Q4 to be turned on or off according to the communication between the battery pack 1 and the single chip microcomputer 3 (normal or abnormal), and then controls the second relay K2 to be turned on or off.

It can be seen that the charging output protection circuit of the present invention is essentially a dual relay charging output protection circuit composed of a first relay K1 hardware control circuit and a second relay K2 software control circuit, and in the dual relay charging output protection circuit, the hardware control unit can cut off or turn on the charging connection of the main output of the charger 2 and the battery pack 1 in a timely and effective manner. For example, when the detecting circuit detects that the voltage of the charging port 11 of the battery pack 1 is abnormal, the hardware control unit drives the first relay K1 to be switched off, and when the second relay K2 does not obtain the charging voltage from the first relay K1, even if the second relay K2 is in the pull-in state, the charger 2 does not output a voltage, and the battery pack 1 does not receive the charging voltage, and then sends a feedback to the charger 2, and the single chip microcomputer 3 sends an instruction to the second triode Q4 according to the received information feedback. The second triode Q4 controls the second relay K2 to be switched off. At this time, the entire charger 2 is completely turned off, and the double protection of the output of the charger 2 is realized, thereby avoiding further expansion of the fault and reducing the safety hazard; when the detecting circuit detects that the voltage of the charging port 11 of the battery pack 1 is normal, the hardware control unit drives the first relay K1 to be switched on, and after the communication between the battery pack 1 and the charger 2 is normal, the single chip microcomputer 3 drives the second relay K2 to be switched on. At this time, the charger 2 starts charging the battery pack 1.

Figure 4:
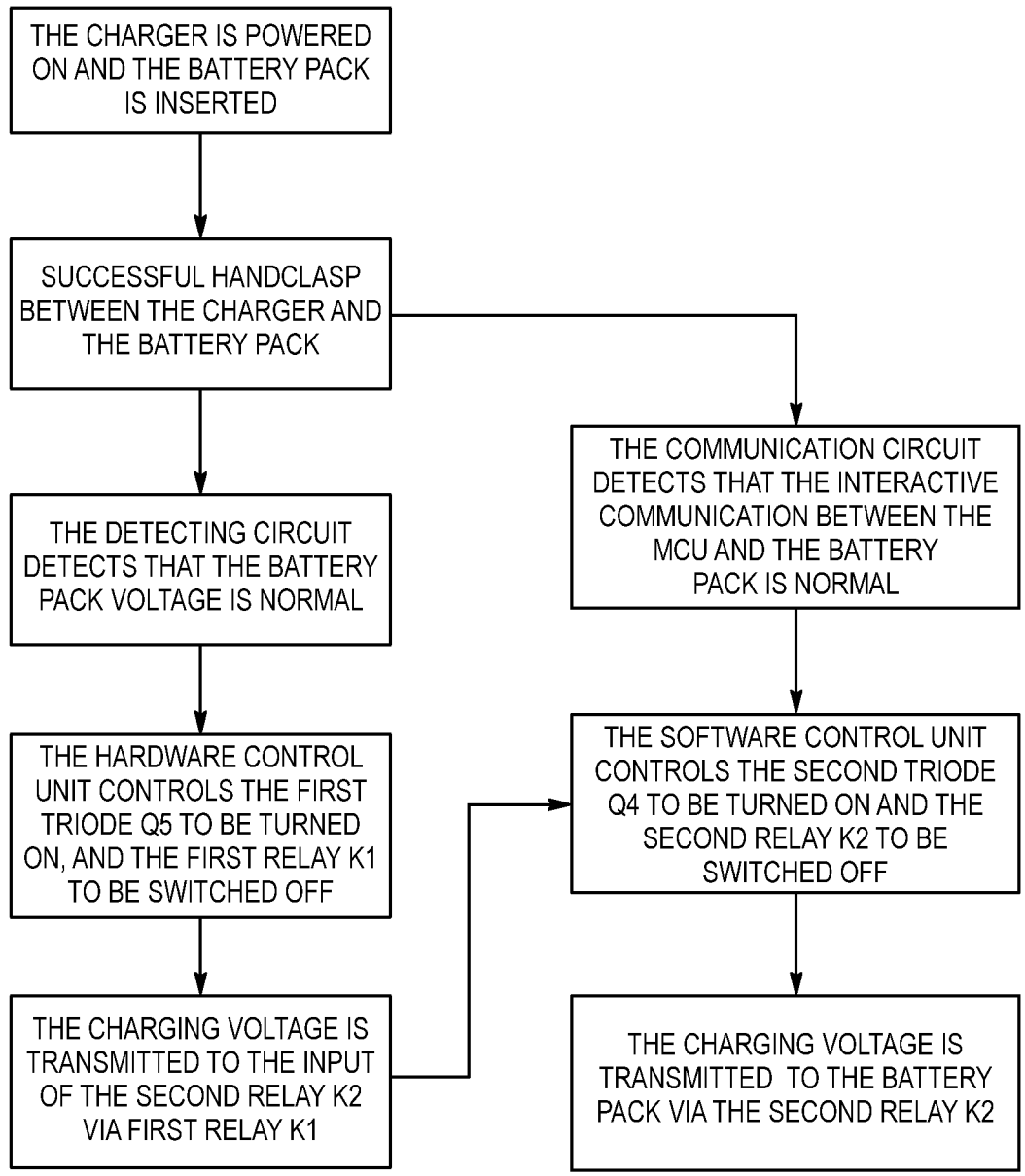
FIG. 4 is a flow chart of a charging output protection method according to embodiments of the invention.

Please refer to FIG. 4, the charging output protection method of the present invention mainly includes the following steps:

the charger 2 is connected to the battery pack 1 and powered on;

the communication circuit detects whether the charger 2 and the battery pack 1 complete the communication handclasp;

after the charger 2 and the battery pack 1 complete the communication handclasp, the detecting circuit detects whether the voltage of the battery pack 1 is normal, and the communication circuit detects whether the interactive communication between the single chip microcomputer 3 and the battery pack 1 is normal;

when the voltage of the battery pack 1 is normal, the hardware control unit controls the first triode Q5 to be turned on, the first relay K1 to be switched on, and the charging voltage of the charger 2 is transmitted to the input of the second relay K2 via the first relay K1;

when the interactive communication between the single chip microcomputer 3 and the battery pack 1 is normal, the software control unit controls the second triode Q4 to be turned on, the second relay K2 to be closed, and the charging voltage of the charger 2 is transmitted to the battery pack 1 via the second relay K2, at this time, the charger 2 starts charging the battery pack 1.

It should be noted that during the charging process, the exchange of information such as voltage, current, temperature, time, etc. is completed instantly between the charger 2 and the battery pack, continue until the end of charging. In addition, the charging output protection circuit of the present invention can be applied to the charger 2 of 40V, 60V, and 80V.

The charging output protection circuit according to embodiments of the invention not only solves the problem that the software/hardware control single relay or the single MOS transistor control circuit cannot be safely applied to the high voltage output occasion, but also solves the problem of information hysteresis delay in the detection of the voltage of the battery pack 1 by the charger 2, for instance, hysteresis delay in detecting the battery pack low voltage (less than 25V) charge protection. In addition, the charging output protection circuit of the present invention eliminates the mechanical trigger switch at the input of the charger 2, so that the external structure of the charger 2 is simplified, and the contact failure of the mechanical trigger switch is avoided.

In summary, the beneficial effects of the present invention are: the charging output protection circuit according to embodiments of the invention is composed of a first relay K1 controlled by a hardware control unit and a second relay K2 controlled by a software control unit, and the charging output is controlled by the two-stage relay control, so that when one relay control fails, the other relay control can also turn off the charging output and plays a protective role, which solves the problem that the software/hardware control single relay or the single MOS transistor control circuit cannot be safely applied to the high voltage output occasion in the prior art, and effectively reduces or mitigates the safety hazard, improves the reliability of charging, and responds quickly when the fault occurs, which also makes the charger product more in line with the requirements of safety certification.

The above embodiments are only used to illustrate the technical solutions of the present invention, not for limitation. Although the present invention is described in detail with reference to the preferred embodiments, ordinary technicians in the field should understand that the technical solutions of the present invention may be modified or substituted without departing from the spirit and scope of the technical solutions of the present invention.

The invention claimed is:

1. A charging output protection circuit comprising a battery pack, a charger, a hardware control unit, and a software control unit, wherein said hardware control unit comprising a detecting circuit for detecting whether a voltage of the battery pack is normal, a first triode connected to the detecting circuit, and a first relay, said first triode is configured to control said first relay to be switched off or on based on the detection result of the detecting circuit; said software control unit comprises a single chip microcomputer, a communication circuit for communicating between the single chip microcomputer and the battery pack, a second triode and a second relay connected to the single chip microcomputer, and said second triode is used for controlling the second relay to be switched off or on based on the instruction of the single chip microcomputer, and said battery pack has a charging port and a communication port, and said detecting circuit is configured to detect a voltage value of the charging port of the battery pack and compare it with a reference voltage value, and said detecting circuit comprises a voltage comparator for comparing the detected voltage value of the battery pack charging port with a reference voltage value and outputting a high/low level based on the comparison result, said hardware control unit controls said first triode to be turned on or off based on the high/low level to make said first relay to be switched on or off.

2. The charging output protection circuit according to claim 1, wherein one end of said communication circuit is connected to the single chip microcomputer, and the other end is connected with the communication port of the battery pack to realize the interactive communication between the single chip microcomputer and the battery pack.

3. The charging output protection circuit according to claim 2, wherein said communication circuit is configured to transmit voltage, current, temperature and time information between said single chip microcomputer and the communication port of said battery pack, and said software control unit is configured to control said second triode to be turned on when the communication circuit operates normally, so that said second relay is switched on.

4. The charging output protection circuit according to claim 1, wherein said detecting circuit further comprises a voltage division circuit, wherein a voltage value of said charging port of said battery pack is transmitted to said voltage comparator through said voltage division circuit.

5. The charging output protection circuit according to claim 1, wherein said battery pack has an electrode port, and said single chip microcomputer is connected to said electrode port to monitor the voltage of the battery pack.

6. A charging output protection method applicable to said charging output protection circuit as claimed in claim 1, wherein said battery pack has a charging port and a communication port, and said detecting circuit is configured to detect a voltage value of the charging port of the battery pack and compare it with a reference voltage value, said detecting circuit comprises a voltage comparator for comparing the detected voltage value of the battery pack charging port with a reference voltage value and outputting a high/low level based on the comparison result, said hardware control unit controls said first triode to be turned on or off and controls said first relay to be switched on or off based on the high/low level, and said charging output protection method comprises the following steps:

connecting the charger to the battery pack and powering on;

detecting, by the communication circuit, whether the charger and the battery pack complete the communication handclasp;

detecting, by the detecting circuit, whether the voltage of the battery pack is normal, and detecting, by the communication circuit, whether the interactive communication between the single chip microcomputer and the battery pack is normal, when the charger and the battery pack complete the communication handclasp;

controlling, by the hardware control unit, the first triode to be turned on, and the first relay to be switched on, when the voltage of the battery pack is normal, such that the charging voltage of the charger is transmitted to the input of the second relay via the first relay;

controlling, by the software control unit, the second triode to be turned on, and the second relay to be switched on, when the interactive communication between the single chip microcomputer and the battery pack is normal, such that the charging voltage of the charger is transmitted to the battery pack via the second relay.

7. The charging output protection method according to claim 6, wherein one end of said communication circuit is connected to the single chip microcomputer, and the other end is connected with the communication port of the battery pack to realize the interactive communication between the single chip microcomputer and the battery pack.

8. The charging output protection method according to claim 6, wherein said communication circuit is configured to exchange voltage, current, temperature and time information between the single chip microcomputer and the battery pack.

* * * * *